US011223796B1

(12) United States Patent
Gangwal

(10) Patent No.: US 11,223,796 B1
(45) Date of Patent: Jan. 11, 2022

(54) LOW RESOLUTION PROCESSING OF HIGH RESOLUTION VIDEO IN SUPPORT OF VIDEO-BASED COMPUTING SERVICES

(71) Applicant: Amazon Technologies, Inc., Seattle, WA (US)

(72) Inventor: Om Prakash Gangwal, Fremont, CA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 16/911,758

(22) Filed: Jun. 25, 2020

(51) Int. Cl.
*H04N 7/01* (2006.01)
*H04N 19/59* (2014.01)
*H04N 19/146* (2014.01)

(52) U.S. Cl.
CPC .......... *H04N 7/0117* (2013.01); *H04N 7/013* (2013.01); *H04N 7/0125* (2013.01); *H04N 19/146* (2014.11); *H04N 19/59* (2014.11)

(58) Field of Classification Search
CPC .......... H04N 5/232935; H04N 7/0117; H04N 7/013; H04N 7/0125; H04N 19/146; H04N 19/59; H04N 5/23235; H04N 5/23245; G06T 2207/10016
See application file for complete search history.

(56) References Cited

U.S. PATENT DOCUMENTS

| 10,110,935 B2 * | 10/2018 | Elliott ............ H04N 21/234345 |
| 10,560,640 B2 * | 2/2020 | Kamiya ............... H04N 5/2351 |
| 10,817,987 B2 * | 10/2020 | Park ...................... H04L 65/607 |
| 10,863,105 B1 * | 12/2020 | Rosengaus ........... G06K 9/4661 |
| 2015/0016748 A1 * | 1/2015 | Ko ............................ G06T 1/20 382/299 |
| 2015/0350547 A1 * | 12/2015 | Nariani-Schulze ......................... H04N 5/23254 348/208.1 |
| 2017/0223395 A1 * | 8/2017 | Elliot ............. H04N 21/234345 |
| 2018/0338082 A1 * | 11/2018 | Baqai ................... G06K 9/6202 |
| 2018/0338086 A1 * | 11/2018 | Marineau-Mes ......... G06T 5/50 |
| 2019/0058905 A1 * | 2/2019 | Elliott ............... H04N 21/2402 |

* cited by examiner

*Primary Examiner* — Paulos M Natnael
(74) *Attorney, Agent, or Firm* — Kilpatrick Townsend & Stockton LLP

(57) ABSTRACT

Techniques for processing video data are described. In an example, a device receives input video data having a first resolution. A first processor of the device sends, based at least in part on the input video data, first video data having the first resolution to a display. The device generates second video data from the input video data by at least down scaling the input video data to a second resolution, the second resolution being lower than the first resolution. A second processor of the device determines, while the first video data is presented, a property of the input video data based at least in part on the second video data. The second processor generates an indication of the property, where the indication is output while the first video data is presented.

20 Claims, 9 Drawing Sheets

LOW RESOLUTION PROCESSING OF HIGH RESOLUTION VIDEO IN SUPPORT OF VIDEO-BASED COMPUTING SERVICES

BACKGROUND

A multimedia device can present video at different resolutions. Ultra high definition (UHD) video is gaining popularity due in part to its high resolution of 3840×2160 for 4K UHD and 7680×4320 for 8K UHD. Typically, the video is protected and compressed for reasons including, for instance, digital rights management (DRM), memory storage bandwidth, and network transmission bandwidth. The resolution, protection, and/or compression may restrict functionalities related to the processing of the video on the multimedia device.

BRIEF DESCRIPTION OF THE DRAWINGS

Various embodiments in accordance with the present disclosure will be described with reference to the drawings, in which.

DETAILED DESCRIPTION

Figure 1:
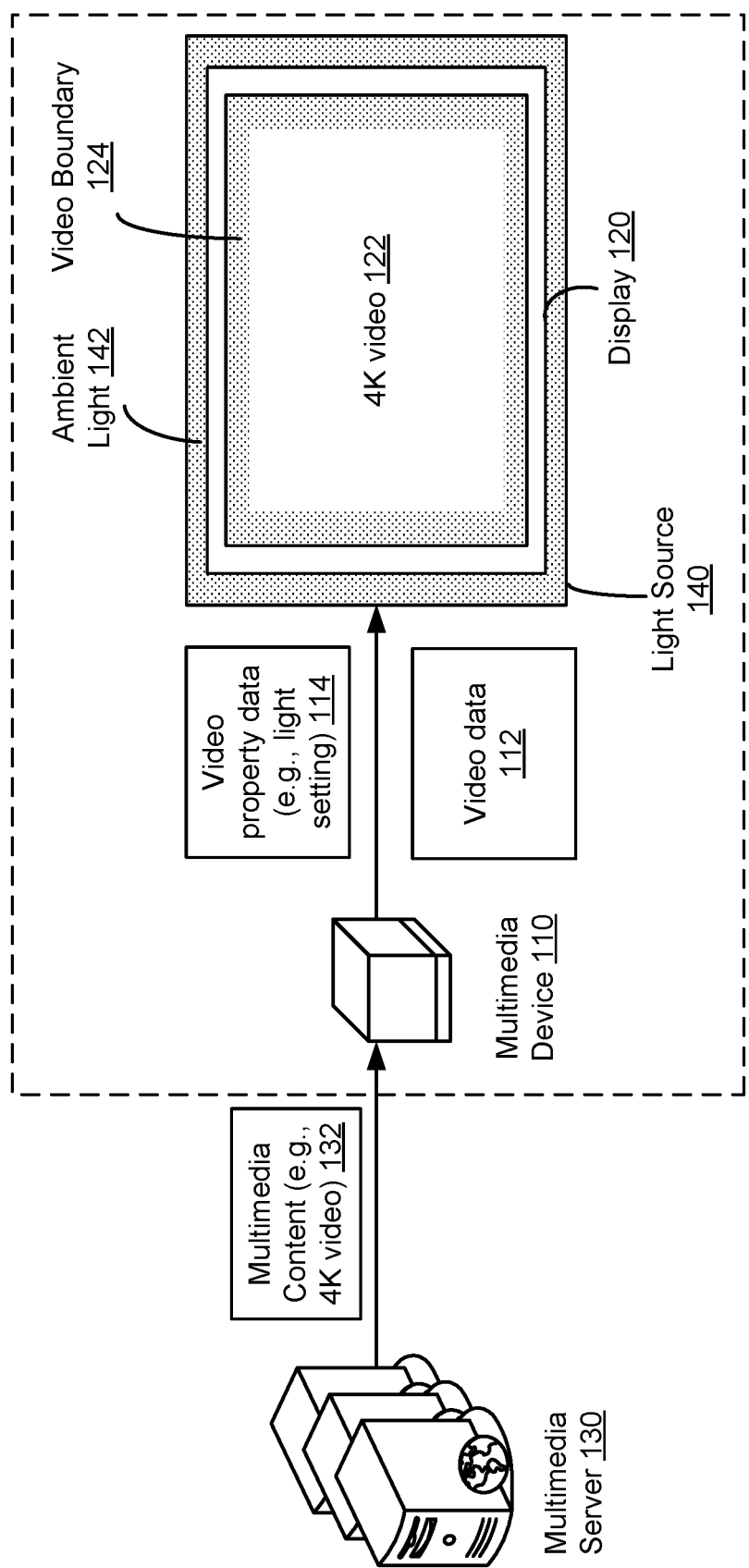
FIG. 1 illustrates an example of a system that includes a multimedia device coupled with a display, according to at least one embodiment of the present disclosure.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Embodiments of the present disclosure are directed to, among other things, low resolution processing of a high resolution video in support of video-based computing services, where such services can be provided in real-time and in parallel to a presentation of the high resolution video. In an example, a multimedia device receives input video data that has a high resolution. A first processor of the multimedia device can have access to a first memory buffer and, optionally, a set of compression and decompression algorithms to process the input video data and present high resolution video data on display. A second processor of the multimedia, such as a general purpose processor (GPP) may not have access to the high resolution video data, the first memory buffer, and/or the compression and decompression algorithms. Instead, the multimedia device includes a down scaler that scales down the input video data to a low resolution video data and that stores the low resolution video data in a second memory buffer. The second processor receives the low resolution video data from the second memory buffer and performs pixel analysis on the received low resolution video data to determine a property of the input video data. The second processor sends an indication of the property to a video-based computing service that then presents the indication in a visual and/or audible manner while the high resolution video is being presented on the display.

To illustrate, consider an example of a multimedia device that is capable of presenting a UHD video on a display communicatively coupled with the streaming multimedia device over an HDMI interface. The display includes a controllable light source of light emitting diodes (LEDs) around its edge. In this illustration, a video-based computing service includes controlling the emission by the light source of ambient light to correspond to the dominant color within the boundary of the video presented on the display. The multimedia device receives a video stream from a multimedia server corresponding to a UHD video, where this stream is compressed with a first codec (e.g., Moving Picture Experts Group-4 (MPEG-4)). The multimedia device decompresses the stream to generate input video data at the UHD resolution. A UHD-enabled processor of the multimedia device processes the input video data to present UHD video on the display. A down scaler of the multimedia device generates low resolution video data by scaling the input video data from the UHD resolution to a resolution lower than or equal to 720p (e.g., to 360p or 720p). A GPP of the multimedia device, such as a central processing unit (CPU) or a graphics processing unit (GPU), receives the low resolution video data, transforms high dynamic range (HDR) bit values for pixels that belong to a boundary of the low resolution video data to low dynamic range (SDR) bit values, and determines the dominant red green blue (RGB) color from the low SDR bit values. The GPP sends a color value that indicates the dominant RGB color to the controllable light source. In turn, the controllable light source emits light from its LEDs at a wavelength that corresponds to the color value.

Embodiments of the present disclosure provide various technological improvements over conventional multimedia devices. Whereas a conventional multimedia device may support the presentation of a high resolution video (e.g., at a UHD resolution), hardware protection (e.g., dedicated processing pipeline) and/or software protection and video size management (e.g., proprietary compression and decompression algorithms) can prevent video-based computing services. In contrast thereto, embodiments of the present disclosure support video-based computing services. In particular, a multimedia device implementing one or more of the disclosed embodiments can supplement the hardware protection, software protection, and video size management by including a low resolution pipeline. This low resolution pipeline operates in real-time on a low resolution version of the high resolution video to generate and send output data to one or more video-based computing services. These and other technological improvements are further described in connection with the next figures.

As used herein, "high" and "low" are used in a relative manner, where "high" indicates a higher resolution than "low." In a specific example, "high" resolution refers to a resolution that is equal to or higher than 1920×1080 (e.g., at least 1080p) or any other minimum resolution that is subject to DRM protection. In certain examples, the "high" resolution is at least 3840×2160 (e.g., at least 4K UHD). Further, "low" resolution refers to a resolution that is lower than or equal to 720p (e.g., 1280×720) or any other maximum resolution that meets DRM protection-free video data processing. However, the embodiments of the present disclosure are not limited to this specific example and similarly apply other resolutions, where a high resolution is higher than a low resolution.

In the interest of clarity of explanation, various embodiments of the present disclosure are described herein with the specific example of a 4K UHD resolution and a 720p resolution. However, the embodiments are not limited as such and similarly apply to input video data that has any high resolution and to the processing of any low resolution version of the input video data in support of a video-based computing service. Further, embodiments can be similarly applied to input video data that has a low resolution and to the processing of the low resolution input video data in support of the video-based computing service.

Various types of a video-based computing service are possible. An example includes emitting ambient light to correspond to one or more colors present in a high resolution video, such as a dominant color around the boundary of the high resolution video. Another example includes detecting an object presented in the high resolution video and/or a location of the object and indicating this detection in overlay of an graphical user interface (GUI) element over the object or around the object in the high resolution video. Yet another example includes recognizing the object and linking the GUI element to content about the object. In a further example, the low resolution video data can be used as index frames that support fast forward and rewind previews of the high resolution video. Such examples of the video-based computing service are further described in connection with the next figures. Generally, a video-based computing service refers to a computing service that determines a property of a high resolution video from a low resolution version of the high resolution video and that outputs an indication of the property, where the indication is usable to present a visual indication of the properly (e.g., via a light emission, a GUI element, and the like) or an audible presentation of the property (e.g., a chime, an audio file, a music track, and the like).

FIG. 1 illustrates an example of a system that includes a multimedia device 110 coupled with a display 120, according to at least one embodiment of the present disclosure. The multimedia device 110 is also communicatively coupled with a multimedia server 130. Multimedia content 132 received from the multimedia server 130 is processed at the multimedia device 110 and sent as video data 112 to the display 120 for presentation thereon. Additionally, the multimedia device 110 generates, based on a low resolution version of the multimedia content 132, video property data 114 that indicates a property of the multimedia content 132 (or, equivalently, of the video data 112). The video property data 114 is usable in support of a video-based computing service. In the illustrative example of FIG. 1, the video-based computing service includes emission by a light source 140 of ambient light 142, although other types of video-based computing service are possible.

The multimedia device 110 can be a user device suitable for supporting the presentation of video on the display 120. In the illustration above, the multimedia device 110 is a streaming media player. Other user device types are also possible, such as a set top box, or a media player that presents video from local storage (e.g., from disk or computer-readable medium that can be inserted in the media player). Further, the multimedia device 110 can be communicatively coupled with the display 120 via a wired data interface (e.g., one using a data cable or only a connector plug) and/or a wireless data interface, including HDMI and/or WiFi. Alternatively and as shown with the dashed rectangle around the multimedia device 110 and the display 120, the multimedia device 110 can be integrated with the display 120, where components of the multimedia device 110 are implemented in hardware and/or software executed on hardware of the display 120.

The multimedia server 130 can be a remote computing resource that stores multimedia files, including video files at different resolutions and formats. For example, the multimedia server 130 is a content server communicatively coupled with the multimedia device 110 over one or more data networks having at least a portion that is public (e.g., using the Internet).

The multimedia content 132 can correspond to a video stream of a high resolution video (e.g., a 4K UHD video). Because the high resolution involves a large amount of data (e.g., eight megapixels per video frame at a sixty frames per second, or in other words, four-hundred eighty megapixels of video data to be streamed per second), the high resolution video is compressed according to a particular codec (e.g., MPEG-4 codec), reducing the amount of video data that needs to be transmitted over the data network(s). The multimedia device 110 receives the multimedia content 132 and decompresses the received video data to re-generate the high resolution video (e.g., eight megapixels per video frame at a sixty frames per second). In another example, the high resolution video is uncompressed and is received via an HDMI input port of the multimedia device 110.

As further described in connection with the next figures, the high resolution video can be subject to DRM protection against illegal access, copying, editing, or altering. In the case of HDMI video input, the DRM protection can include high-bandwidth digital content protection (HDCP). To meet the DRM protection, the multimedia device 110 includes a secure pipeline for processing the high resolution video, whereby computing components that are logically and/or physically outside of the secure path do not have access to data within the secure pipeline. The secure pipeline is referred to herein as a high resolution video processing pipeline. Optionally, because of the large size of the high resolution video (e.g., eight megapixels of video data per video frame or four-hundred eighty megapixels of video data per second), the multimedia device 110 recompresses the high resolution video data according to another codec (e.g., embedded compression that achieves a compression by a factor of two or more and that can be lossless), and further processes it through the secure pipeline. This processing results in outputting the video data 112 at the same frames per second rate (e.g., sixty frames per second) via the wired or wireless data interface to the display 120. The video data 112 represents a copy of the high resolution video and has the same resolution (e.g., 4K UHD resolution). In turn, the display 120 presents the video data 112 as a video 122 on a GUI, where the video 112 has the same high resolution (e.g., 4K UHD resolution) and the same frame rate (e.g., sixty frames per second).

In addition, the multimedia device 110 generates a low resolution copy of the decompressed, high resolution video by, for instance, down scaling this video by at least a factor of three (e.g., to generate a low resolution video at a 720p resolution or lower). Further, the low resolution copy can be generated at the same frame rate (e.g., sixty frames per second) or at a lower frame rate (e.g., thirty frames per second; in which case, the amount of low resolution video data is further reduced). The low resolution copy is input to a different processing pipeline of the multimedia device 110, referred to herein as a low resolution video processing pipeline. Through that pipeline, the multimedia device 110 determines a property of the video 122 based on the low resolution copy and outputs the video property data 114 that includes an indication of this property. In the illustrative example of FIG. 1, a video boundary 124 of the video 122 (e.g., the area around the displayed area of the video 122 and having a particular height and width defined in terms of numbers of pixels or lines) has a dominant color (e.g., sunset orange, corresponding to a sunset scene shown in the video 122). The video property data 114 indicates this dominant color (e.g., a light setting that includes an RGB value of sunset orange).

In the illustrative example of FIG. 1, the light source 140 interfaces with the display 120. For example, the light source 140 is communicatively coupled with a wired or wired data interface of the display 120. The video property data 114 is sent, via the display 120, from the multimedia device 110 to the light source 140. In turn, the light source 140 determines the light setting from the video property data and emits ambient light 142 having that light setting (e.g., sunset orange color light). Of course, other implementations of the light source 140 are possible. For instance, the light source 140 can be integrated with the display 120. The light source 140 can interface directly with the multimedia device 110, rather than indirectly via the display 120. Or, the light source 140 can be integrated with the multimedia device 110 itself.

As explained herein above, emitting ambient light that mimics the color of at least a portion of a presented video is only one example of a video-based computing service. Other types of services are possible. For instance, the video 122 may show an object (e.g., a purse of a particular designer). The video property data 114 may indicate a detection of the object (e.g., that an object or a generic purse is detected), a location of the object (e.g., a bounding box around a pixel location of the purse in the video 122), a frame location where the object appears, persists, or disappears (e.g., a start anchoring frame and an end anchoring frame), and/or a recognition of the object (e.g., an identifier of the particular designer, style, and/or product number of the purse). One or more of these indications can be presented by overlaying corresponding GUI elements over the video 122 (e.g., an arrow pointing to a purse, a bounding box around the purse, a frame anchor, a clickable link for a purse advertisement or to an e-commerce platform or website from which the particular purse is available, and the like).

Figure 2:
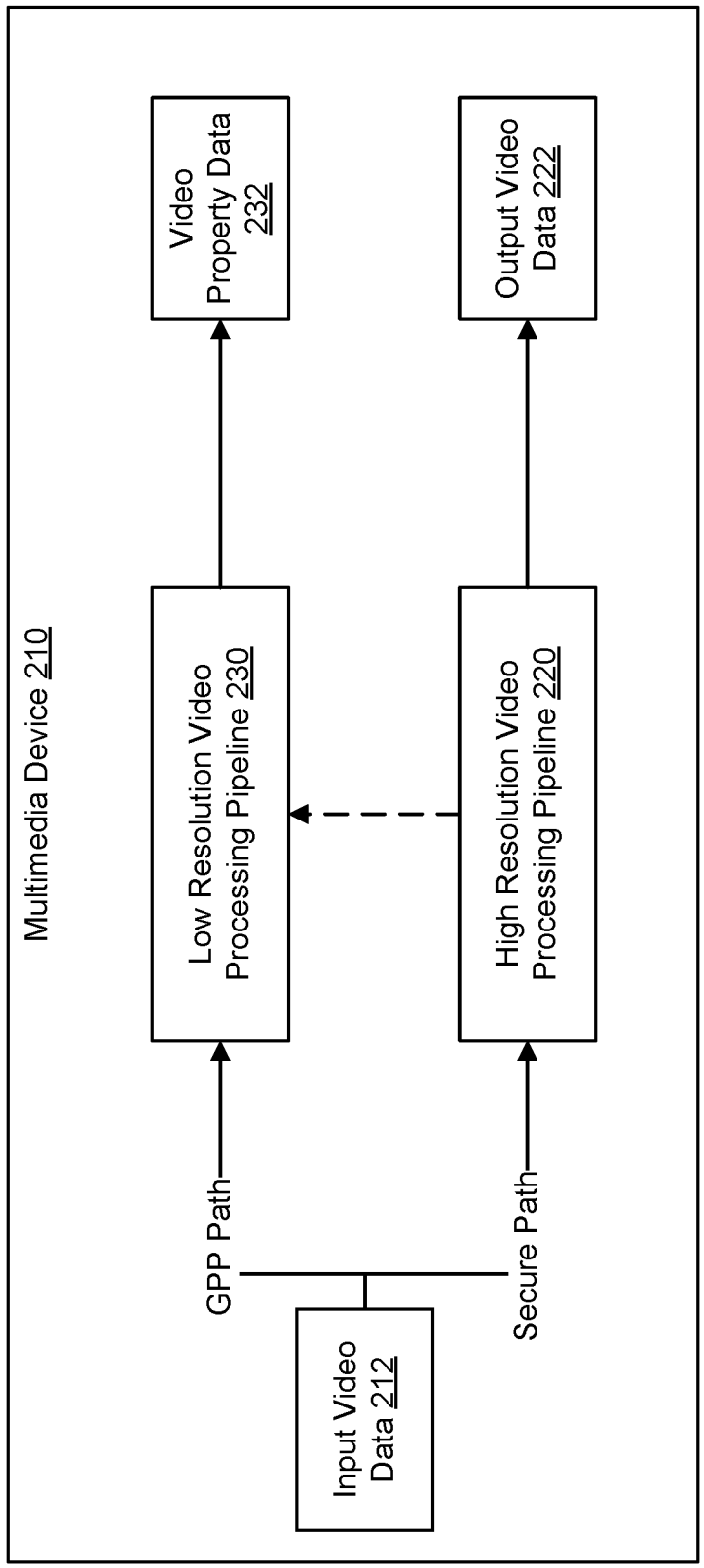
FIG. 2 illustrates an example of video processing pipelines of a multimedia device, according to at least one embodiment of the present disclosure.

FIG. 2 illustrates an example of video processing pipelines of a multimedia device 210, according to at least one embodiment of the present disclosure. The multimedia device 210 is an example of the multimedia device 110 of FIG. 1. As illustrated, the video processing pipelines include a high resolution video processing pipeline 220 and a low resolution video processing pipeline 230, which can be operated in parallel. In particular, input video data 212 can be input to the high resolution video processing pipeline 220. In real-time (e.g., at substantially the same time, with a time margin of a few milliseconds) relative to this inputting, the input video data 212 can also be input to the low resolution video processing time 230. Based on the input video data 212, the high resolution video processing pipeline 220 outputs video data 222, which is an example of the video data 112 of FIG. 1. Also based on the same input video data 212, the low resolution video processing pipeline 230 outputs video property data 232, which is an example of the video property data 114 of FIG. 1.

In an example, the high resolution video processing pipeline 220 and the low resolution video processing pipeline 230 are separate from each other, whereby processing of high resolution video data is only possible via the high resolution video processing pipeline 220, processing of low resolution video data is possible via the low resolution video processing pipeline 230, and processed video within the high resolution video processing pipeline 220 is not accessible to the low resolution video processing pipeline 230. The separation can be logical and/or physical. In particular, the two pipelines 220 and 230 may not share computing resources (e.g., processors, memory buffers, codec libraries, etc.), or if a hardware computing resource is shared, the functionalities of such a component are logically separated between the two pipelines 220 and 230.

As illustrated, the input video data 212 can have a high resolution (e.g., corresponds to a high resolution video of at least 4K UHD, such that the input video data 212 includes eight megapixels per video frame). The high resolution video processing pipeline 220 processes this high resolution video data, along a secure path not accessible to one or more GPPs of the low resolution video processing pipeline 230, to generate the output video data 222. In comparison, the low resolution video processing pipeline 230 does not access to the output video data 222 or other intermediate data generated by the high resolution video processing pipeline 220. Instead, the low resolution video processing pipeline 230 generates, along a GPP path that includes one or more GPPs, low resolution video data from the input video data 212 (e.g., corresponds to a low resolution video of 720p or lower, such that the low resolution video data includes about one megapixels per video frame). The low resolution video processing pipeline 230 processes the low resolution video data to generate the video property data 224.

In an example, in addition or alternative to inputting the input video data 212 to the low resolution video processing pipeline 230, the high resolution video processing pipeline 220 can output data to the low resolution video processing pipeline 230. For instance, the high resolution video processing pipeline 220 can generate low resolution video data that is then input to the low resolution video processing pipeline 230. In this illustration, the low resolution video processing pipeline 230 need not generate the low resolution video data because such data is received from the high resolution video processing pipeline 220.

Figure 3:
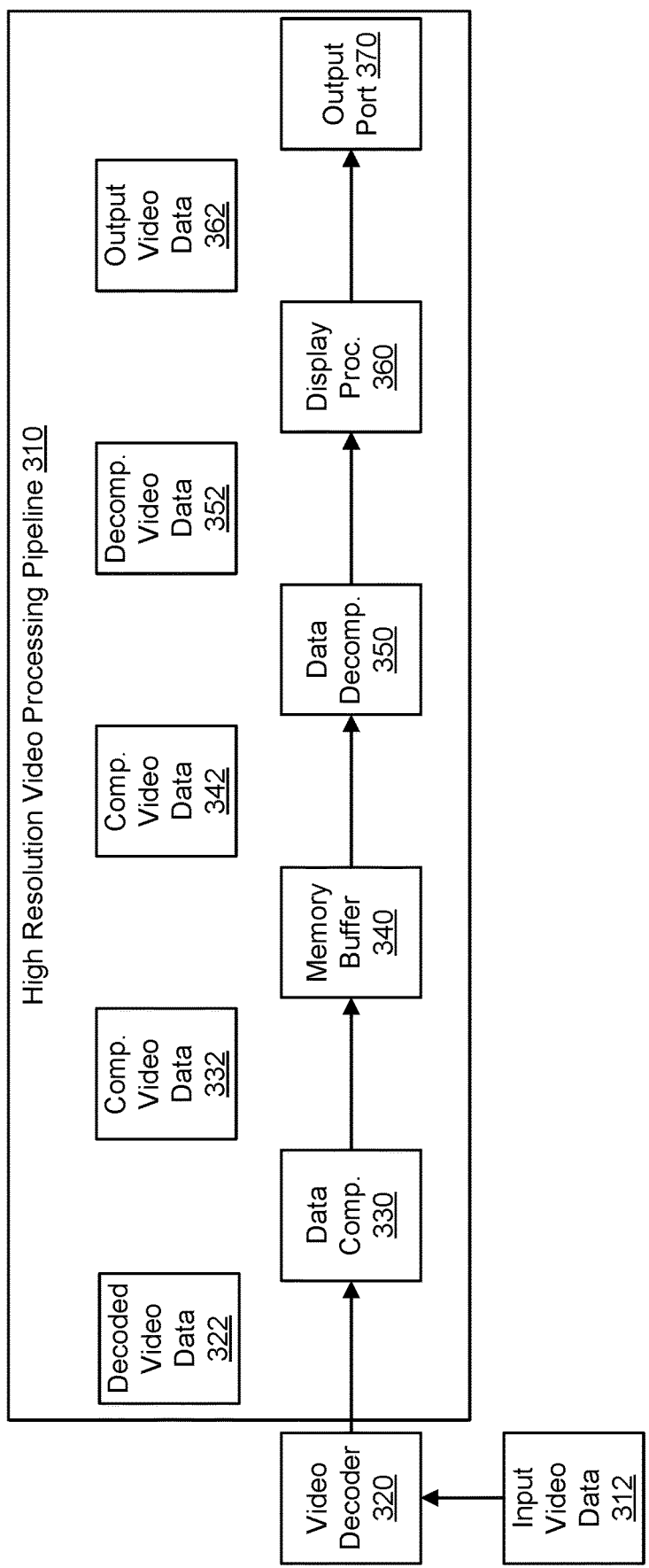
FIG. 3 illustrates an example of components of a high resolution video processing pipeline of a multimedia device, according to at least one embodiment of the present disclosure.

FIG. 3 illustrates an example of components of a high resolution video processing pipeline 310 of a multimedia device, according to at least one embodiment of the present disclosure. The high resolution video processing pipeline 310 is an example of the high resolution video processing pipeline 220 of FIG. 2. As illustrated, input video data 312 is received by a video decoder 320, where the input video data 312 is encoded with a codec (e.g., MPEG-4) to help with, for instance, reducing the amount of data transmission and data storage. The video decoder 320 decodes the input video data 312 with the applicable codec, to generate decoded video data 322. The decoded video data 322 represents a high resolution video (e.g., at least 4K UHD) and is input to the high resolution video processing pipeline 310. Based on processing the decoded video data 322, the high resolution video processing pipeline 310 generates output video data 362 that can be sent to a display. The output video data 362 represents a high resolution video (e.g., at least 4 UHD).

In an example, the high resolution video processing pipeline 310 includes a data compressor 330, a memory buffer 340, a data decompressor 350, a display processor 360, and an output port 370. Such components form a secure path for processing the high resolution video and may be separate from a low resolution video processing pipeline of the multimedia device. The compressor 330 and decompressor 350 can be optional components of the secure path and used in support of a codec implementation. Each of these computing components is described herein next.

The data compressor 330 receives the decoded video data 322 and generates compressed video data 332 by at least compressing the decoded video data 322 according to a compression algorithm. In an example, the compression algorithm reduces the size of the decoded video data 322 by at least a factor of two according to vendor-specific proprietary lossless compression.

The data compressor 330 stores the compressed video data 332 in the memory buffer 340, which is a secure buffer (e.g., only accessible to the computing components of the high resolution video processing pipeline 310) within a dynamic random access memory (DRAM) of the multimedia device. The data decompressor 350 accesses the compressed video data 332 from the memory buffer 340 (e.g., data can be read from the memory buffer 340 and is illustrated in FIG. 3 as compressed video data 342). The data decompressor 350 generates decompressed video data 352 by decompressing the compressed video data 342 according to a decompression algorithm that corresponds to the compression algorithm. With a lossless compression, the decompressed video data 352 corresponds to the decided video data 322 and has the high resolution (e.g., at least 4 UHD). The compression-decompression operations are typically performed such that storage, although transient, of the decoded video data 322 is DRM-protected with a vendor-specific codec. The use of a secure buffer further enhances the DRM protection.

The display processor 360 receives the decompressed video data 352. In an example, the display processor 360 is an input/output (I/O) processor that converts the decompressed video data 352 into a picture definition (e.g., a set of pixel intensity values; illustrated in FIG. 3 as output video data 362) and sends this picture definition (e.g., the output video data 362) to a display in accordance with requirements of the display. The output video data 362 can be sent via the output port 370, that can be a wired or wireless data interface with the display.

Figure 4:
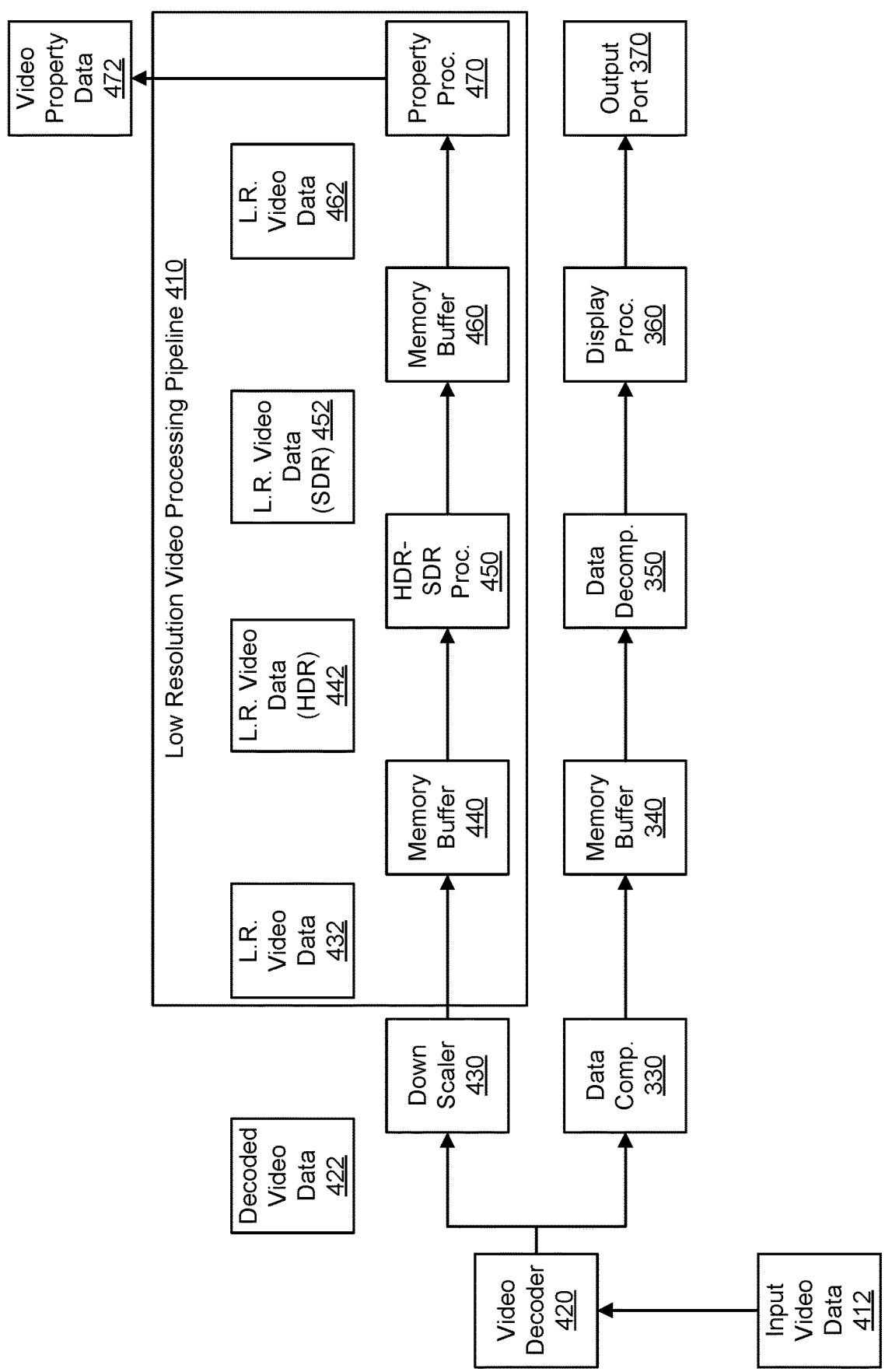
FIG. 4 illustrates an example of components of a low resolution video processing pipeline of a multimedia device, according to at least one embodiment of the present disclosure.

FIG. 4 illustrates an example of components of a low resolution video processing pipeline 410 of a multimedia device, according to at least one embodiment of the present disclosure. The resolution video processing pipeline 410 is an example of the low resolution video processing pipeline 230 of FIG. 2. Further illustrated in FIG. 4 are components of a high resolution video processing pipeline that corresponds to the high resolution video processing pipeline 310 of FIG. 3 (including a data compressor 330, a memory buffer 340, a data decompressor 350, a display processor 360, and an output port 370; the description of these components is not repeated herein in the interest of brevity).

As illustrated, input video data 412 is received by a video decoder 420 of the multimedia device, where the input video data 412 is encoded with a codec (e.g., MPEG-4) to help with, for instance, reducing the amount of data transmission and data storage. The video decoder 420 decodes the input video data 412 with the applicable codec, to generate decoded video data 422. The decoded video data 422 represents a high resolution video (e.g., at least 4 UHD) and is input to a down scaler 430 and to the high resolution video processing pipeline. The down scaler 430 generates low resolution video data 432 from the decoded video data and the low resolution video data 432 is input to the low resolution video processing unit 410. Based on processing the low resolution video data 432, the low resolution video processing pipeline 410 generates video property data 472 that can be sent to a display, a GPU of the multimedia device (e.g., such that the GPU can overlay a GUI element based on the video property data 472 over video presented on the display), to a user interface of the multimedia device (e.g., to a GUI of the multimedia device or to a speaker system of the multimedia device), and/or to another device (e.g., a light source).

The down scaler 430 receives the decoded video data 422 (which has a high resolution of at least 4K UHD) and generates low resolution video data 432 by scaling down the decoded video data 422 by at least a factor of three. The down scaler 430 can implement a sampling process, a lossy compression process, and/or a machine learning (ML) algorithm for reducing the resolution. Generally, the low resolution video data 432 has a resolution lower than or equal to 720 p (e.g., 1280×720 or about one megapixels per video frame). In an example, depending on the video-based computing service, a targeted low resolution can be achieved. For instance, for color determination and object detection, a 640×360 resolution may be sufficient. For object recognition, a 1280×720 resolution may be used.

The down scaler 430 stores the low resolution video data 432 in the first memory buffer 440, which can be a buffer within a DRAM of the multimedia device. Although the memory buffer 340 of the high resolution video procession pipeline is a secure buffer within the same DRAM, these two memory buffers 440 and 340 are isolated from each other (e.g., physically and/or with logical addressing).

Although FIG. 4 illustrates the down scaler 430 as being separate from the high resolution video processing pipeline, other variations are possible. In an example, the down scaler 430 can be included in the high resolution processing pipeline. For instance, the down scaler 430 can be implemented after the data decompressor 350 and may receive output video data from the decompressor 350 to then generate and output the low resolution video data 432 to the low resolution video processing pipeline 410.

In an example, the low resolution video processing pipeline 410 includes the first memory buffer 440, an HDR-to-SDR processor 450, a second memory buffer 460, and a property processor 470. The HDR-to-SDR processor 450 accesses the low resolution video data 432 from the first memory buffer 440 (e.g., data can be read from the first memory buffer 440 and is illustrated in FIG. 4 as low resolution video data 442). In an example, the decoded video data 422 has an HDR format that uses at least a ten-bit dynamic range to provide a high level of luminance (e.g., about 10,000 nits). This dynamic range may encode the luminance by using a non-linear curve, such as a perceptual quantizer (PQ) curve or an IpCpCt curve. However, a video-based computing service may rely on a SDR format, where the luminance is encoded at a lower level (e.g., up to 1,000 nits) using a linear curve, such as a gamma curve, while providing the color gamut (e.g., the full range of color visible to the human eye). In this case, the HDR-to-SDR processor 450 uses an HDR-to-SDR mapping to transform the low resolution video data 442 having the HDR format into low resolution video data 452 having an HDR format and the same resolution of the low resolution video data 442.

The HDR-to-SDR processor 450 stores the low resolution video data 452 in the second memory buffer 460, which can be another buffer within the DRAM of the multimedia device. Here also, the second memory buffer 460 and the memory buffer 340 of the high resolution video procession pipeline can are isolated from each other.

The property processor 470 accesses the low resolution video data 452 from the second memory buffer 460 (e.g., data can be read from the second memory buffer 460 and is illustrated in FIG. 4 as low resolution video data 462). In an example, property processor 470 determines a property of the decoded video data 422 by analyzing the low resolution data and outputs the property as the video property data 472. The analysis can includes a pixel analysis in the SDR domain that uses bit values of the pixels that are included in the low resolution video data 462. The pixel analysis depends on the type of the video-based computing service. For instance, for ambient light, the dominant gamut color of the pixels within a displayed boundary is determined. For object detection, an edge detection algorithm using the bit values can be used. For object recognition, an ML algorithm trained on bit values can be used.

In the illustration of FIG. 4, the down scaler 430 can be implemented as a hardware block on a system on a chip (SoC). The HDR-to-SDR processor 450 and/or the property processor 470 can be implemented individually or in combination as a hardware block of the SoC or as software process(es) implemented on a GPP, which can be a CPU or a GPU of the multimedia device. In addition, depending on the video-based computing service and/or whether functionalities of the property processor 470 can be implemented in the HDR domain, rather than the SDR domain, the HDR-to-SDR processor 450 may not be needed and only one of the two memory buffers 440 and 460 may be sufficient. Furthermore, the property processor 470 can support multiple video-based computing services. When such services can rely on a same low resolution but involve a different video property, the property processor 470 can use the same low resolution video data from the second memory buffer 460 to determine the different properties and output, for each, the corresponding vide property data. When such services can rely on different low resolutions (e.g., 1280× 720 and 640×360 resolutions), the processing of the decoded video data 422 can be performed sequentially or in parallel for each of the needed low resolutions.

Figure 5:
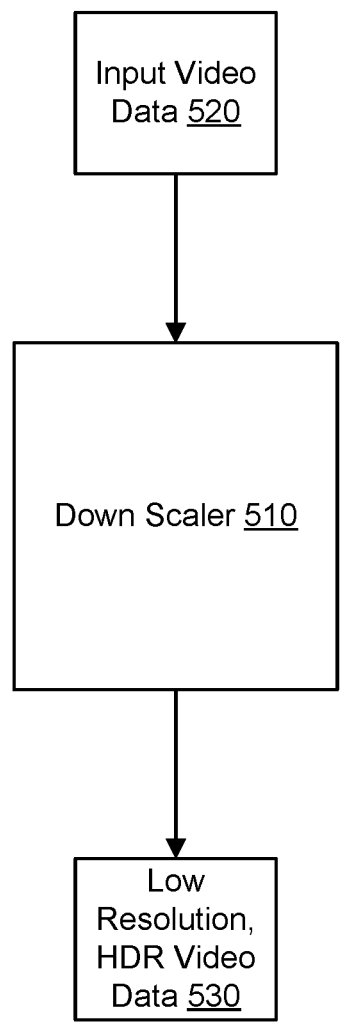
FIG. 5 illustrates an example of a down scaler of a multimedia device, according to at least one embodiment of the present disclosure.

FIG. 5 illustrates an example of a down scaler of a multimedia device, according to at least one embodiment of the present disclosure. The down scaler 510 is an example of the down scaler 430 of FIG. 4 and is a computing component of a low resolution video processing pipeline. Input video data 520 is received by the down scaler 510. The input video data 520 has a high resolution (e.g., at least 4K UHD) and an HDR format (e.g., providing at least 10,000 nits). In turn, the down scaler 510 outputs a low resolution, HDR video data 530. The low resolution, HDR video data 530 has a low resolution (e.g., lower than or equal to 720 p) and an HDR format.

Figure 6:
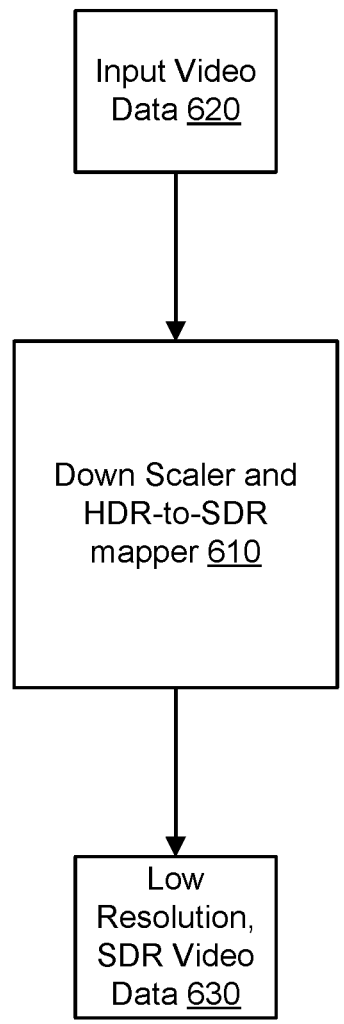
FIG. 6 illustrates an example of a hardware block of a multimedia device including a down scaler and a high dynamic range to low dynamic range processor, according to at least one embodiment of the present disclosure.

FIG. 6 illustrates an example of a hardware block 610 of a multimedia device including a down scaler and an HDR-to-SDR processor, according to at least one embodiment of the present disclosure. Here, the hardware block 610 belongs to a low resolution video processing pipeline, is implemented on a SoC of the multimedia device, and combines the functionalities of the down scaler 430 and the HDR-to-SDR processor 450 of FIG. 4. In particular, input video data 620 is received by the down scaler of the hardware block 610. The input video data 620 has a high resolution (e.g., at least 4K UHD) and an HDR format (e.g., providing at least 10,000 nits). In turn, the down scaler outputs a low resolution, HDR video data. The HDR-to-SDR processor of the hardware block transforms the low resolution, HDR video data into a low resolution, SDR video data 630 by using an HDR-to-SDR mapping. The low resolution, SDR video data 630 has a low resolution (e.g., lower than or equal to 720 p) and an SDR format (e.g., providing less than 1,000 nits).

Figure 7:
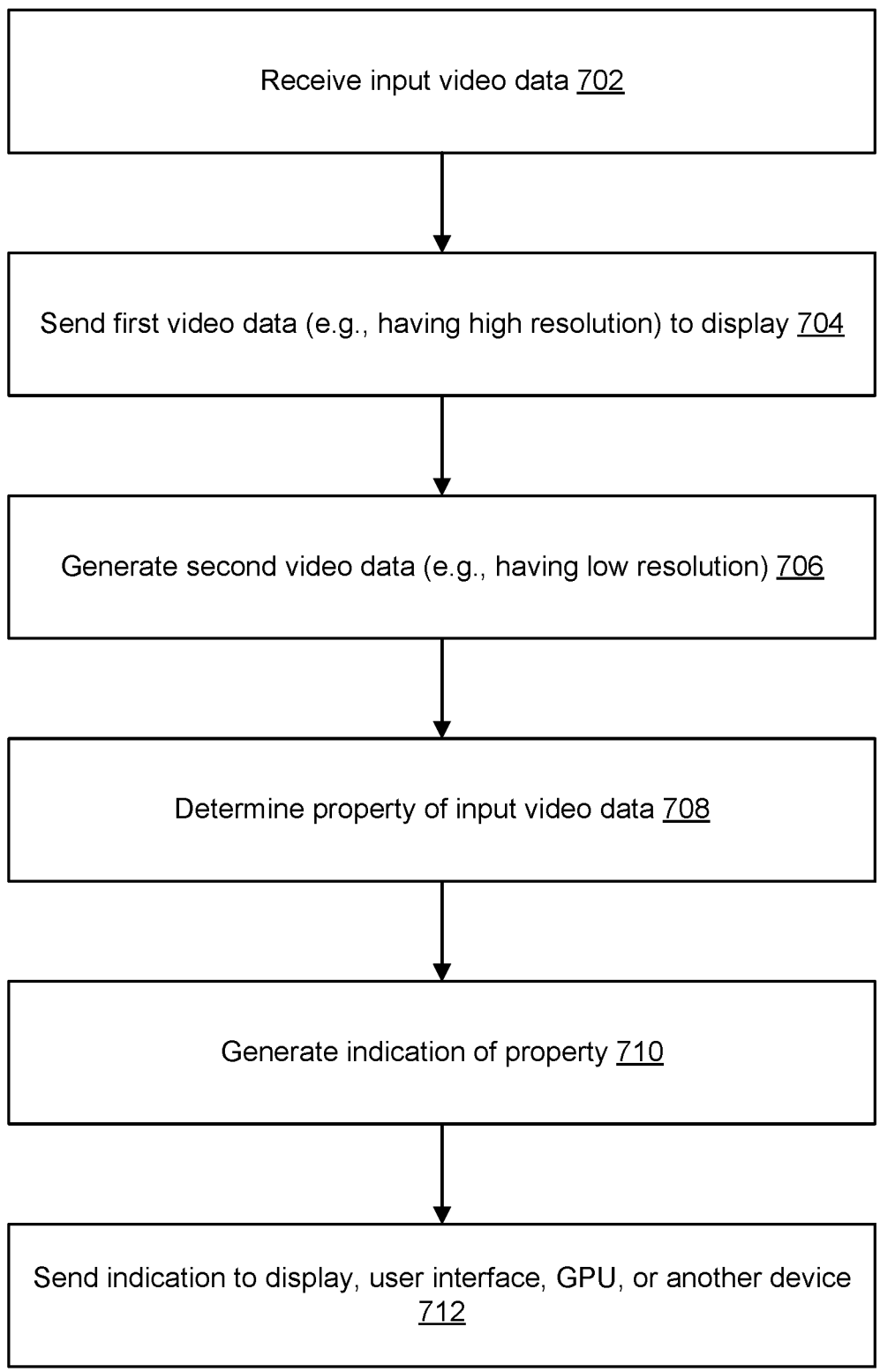
FIG. 7 illustrates an example of a flow for low resolution processing of a high resolution video in support of a video-based computing service, according to at least one embodiment of the present disclosure.
Figure 8:
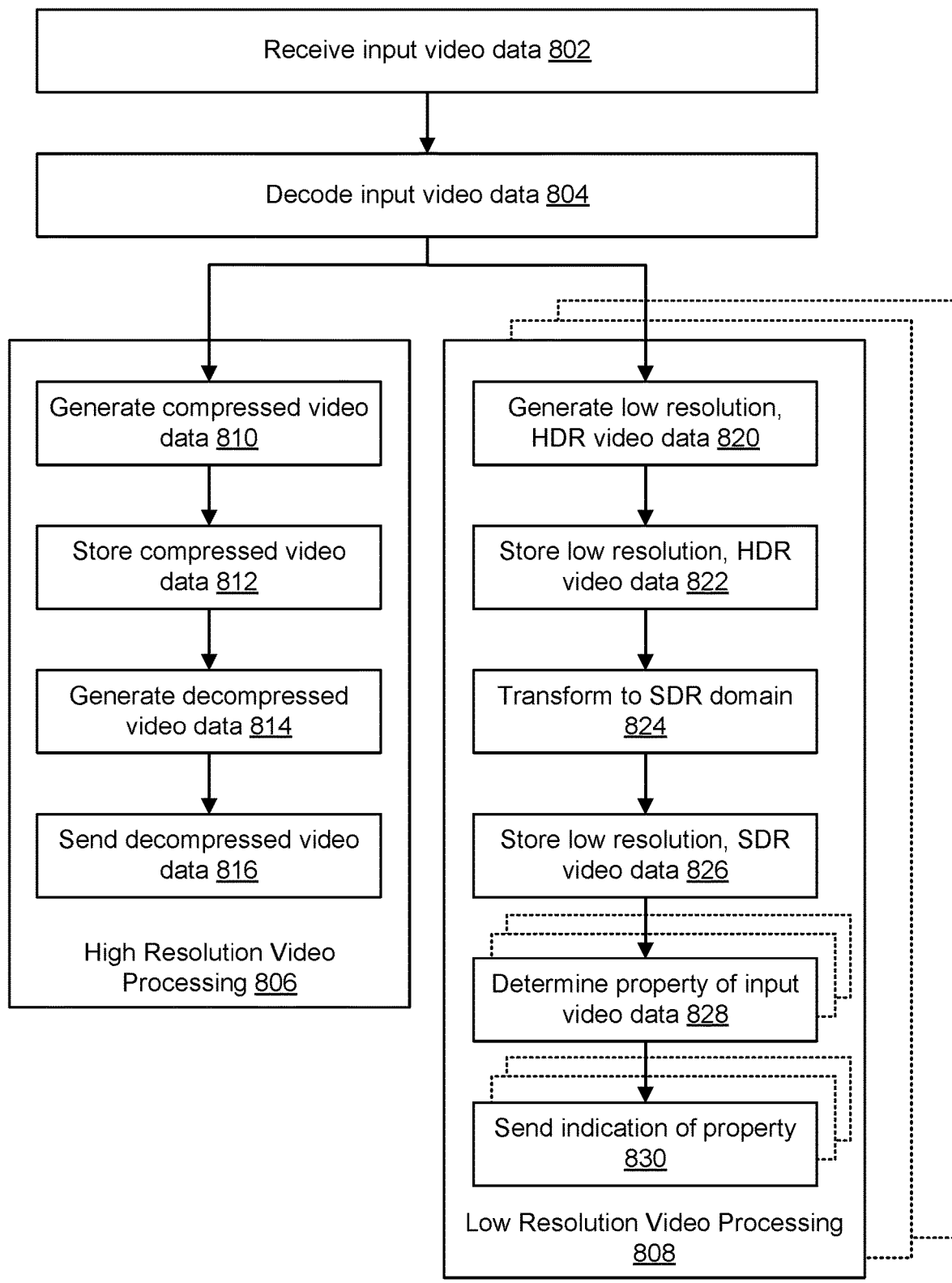
FIG. 8 illustrates an example of a flow for low resolution and high resolution processing of a high resolution video in support of a video-based computing service and a high resolution presentation, according to at least one embodiment of the present disclosure.

FIGS. 7-8 illustrate examples of flows for processing a high resolution video. Operations of the flows can be performed by a multimedia device, such as any of the multimedia devices described herein above. Some or all of the instructions for performing the operations of flows can be implemented as hardware circuitry and/or stored as computer-readable instructions on a non-transitory computer-readable medium of the multimedia device. As implemented, the instructions represent modules that include circuitry or code executable by processors of the multimedia device. The use of such instructions configures the multimedia device to perform the specific operations described herein. Each circuitry or code in combination with the relevant processor(s) represent a means for performing a respective operation(s). While the operations are illustrated in a particular order, it should be understood that no particular order is necessary and that one or more operations may be omitted, skipped, performed in parallel, and/or reordered.

FIG. 7 illustrates an example of a flow for low resolution processing of a high resolution video in support of a video-based computing service, according to at least one embodiment of the present disclosure. Here, the processing is performed by a low resolution video processing pipeline of the multimedia device, including any or a combination of a down scaler, a first memory buffer, an HDR-to-SDR processor, a second memory buffer, and a property processor.

In an example, the flow includes operation 702, where the multimedia device receives input video data. The input video data has a high resolution (e.g., a first resolution of at least 4K UHD per video frame, where the video frame are transmitted with a frame rate of at least sixty frames per second). The input video data may correspond to decoded video data that is output by a video decoder of the multimedia device based on a video stream from a multimedia server, a video download from a file server, a video transmission from another device, and/or video access from local storage of the multimedia device.

In an example, the flow includes operation 704, where the multimedia device sends, based on the input video data, first video data having the first resolution (e.g., high resolution data having the at least 4K UHD per video frame) to a display. For instance, the first video data is generated from the input video data by a first processor of a high resolution video processing pipeline of the multimedia device. The multimedia device is communicatively coupled with the display via a wired or wireless data interface or by being integrated with the display.

In an example, the flow includes operation 706, where the multimedia device generates second video data having a second resolution, where the second resolution is lower than the first resolution. For instance, the second video data is low resolution video data having a resolution lower than or equal to 720 per video frame and corresponding to video frames at the same frame rate of the input video data or at a smaller frame rate. The second video data can be generated based on the input video data, such that the second video data is a low resolution version of the input video data. In particular, the down scaler of the multimedia device generates the second video data from the input video data by at least down scaling the input video data to the second resolution.

In an example, the flow includes operation 708, where the multimedia device determines, while the first video data is being presented, a property of the input video data based on the second video data. In particular, a second processor of the low resolution video processing pipeline, such as the HDR-to-SDR processor and/or the property processor, processes the second video data to determine the property. The processing may include storing and accessing the second video data from one or more memory buffers of the low resolution video processing pipeline, a transformation of the second video data from an HDR domain to an SDR domain, and a pixel-based analysis to determine the property depending on the video-based computing service. For instance, for ambient light, the dominant gamut color of the pixels within a displayed boundary is determined. For object detection, an edge detection algorithm using the bit values can be used. For object recognition, an ML algorithm trained on bit values can be used.

In an example, the flow includes operation 710, where the multimedia device generates an indication of the property, while the first video data is being presented. For instance, the indication is generated as output data depending on parameters needed by the video-based computing service. In particular, for ambient light, the output data includes a color definition. For object detection, the output data includes a bounding box around the object or pixel location of the object. For object recognition, the output data further includes an identifier or a description of the object.

In an example, the flow includes operation 712, where the multimedia device sends an indication of the property to at least one of the display, a user interface of the multimedia device, a GPU of the multimedia device, or another device. The specific recipient of the indication can depend on the video-based computing service. Generally, sending the indication includes sending the output data via a data interface to the recipient. In the case of ambient light, the output data can be sent to the display and/or to a light source coupled or integrated with the display, and/or a light source coupled or integrated with the multimedia device. In the case of object determination (e.g., object detection and/or object recognition), the output data can be sent to the GPU such that the GPU can output a GUI element definition for an overlay of a GUI element on the display.

FIG. 8 illustrates an example of a flow for low resolution and high resolution processing of a high resolution video in support of a video-based computing service and a high resolution presentation, according to at least one embodiment of the present disclosure. Here, the flow is described in connection with using both pipelines: the high resolution video processing and the low resolution video processing pipeline. In addition, an HDR format is assumed and is transformed to an SDR format. Nonetheless, if the input video data has an SDR format, the transformation may not be needed. In addition, if the property determination can process HDR information, the transformation may also not be needed.

In an example, the flow includes operation 802, where the multimedia device receives input video data. The input video data may have a first resolution of at least 4K UHD (and may correspond to a video stream from a multimedia server, a video download from a file server, a video transmission from another device, and/or video access from local storage of the multimedia device. further, the input video data may be compressed with a codec (e.g., MPEG-4) to reduce its size.

In an example, the flow includes operation 804, where the multimedia device decodes the input video data. For instance, the video decoder of the multimedia device uses the applicable codec (e.g., MPEG-4) to decode the input video data into a first decoded video data having the first resolution. The first decoded video data can be input in real-time relative to the decoding and substantially at the same time (e.g., within a few milliseconds of time margin) to the high resolution video processing pipeline and the low resolution video processing pipeline, such that these two pipelines can process the first decoded video data in parallel and in a synchronous manner. Operations 810-816 can be performed by the high resolution video processing pipeline to output high resolution video data to a display for presentation threat based on the first decoded video data. In comparison, operations 820-830 can be performed by the low resolution video processing pipeline to output an indication of a property of the input video data (or, equivalently, the first decoded video data or the high resolution video data being presented on the display), where this output can be to at least one of the display, a user interface of the multimedia device, a GPU of the multimedia device, or another device.

In an example, the flow includes operation 806 for high resolution video processing and operation 808 for low resolution video processing. The operation 806 can correspond to processing of the decoded input video data through a secure path and can include multiple operations, such as operations 810-816 described herein below. In comparison, the operation 808 can correspond to processing of the decoded input video data through a GPP path and can include multiple operations, such as operations 820-830 described herein below. The two operations 806 and 808 can be performed in parallel and in real-time relative to each other.

In an example, the flow includes operation 810, where the multimedia device generates compressed video data by at least compressing the first decoded video data. For instance, a data compressor of the high resolution video processing pipelines compressed the first decoded video data according to a lossless compression algorithm such that the first decoded video data can be protected during the processing for DRM reasons and its size can be reduced for memory bandwidth reasons.

In an example, the flow includes operation 812 where the multimedia device stores the compressed video data in a first memory buffer of the multimedia device. For instance, the data compressor writes the compressed video data in the first memory buffer. The first memory buffer is a secure buffer within a DRAM of the multimedia device, where this secure buffer is inaccessible to the low resolution video processing pipeline.

In an example, the flow includes operation 814, where the multimedia device generates decompressed video data having the first resolution. For instance, a data decompressor of the high resolution video processing pipeline receives the compressed video data from the first memory buffer and decompresses the received data by using the applicable decompression algorithm.

In an example, the flow includes operation 816, where the multimedia device sends the decompressed video to display. For instance, the decompressed video data is received and further processed by a display processor of the high resolution video processing pipeline, where the display processor generates and sends a picture definition (e.g., output video data) to the display via an output port (e.g., a wired or wireless data interface) of the multimedia device.

In an example, the flow includes operation 820, where the multimedia device generates second video data, such as low resolution HDR video data, based on the first decoded video data. The second video data has a second resolution that is lower than the first resolution (e.g., a resolution of 720p or less). Further, the second video data has an HDR format that encodes a high level of luminance (e.g., about 10,000 nits) by using a non-linear curve, such as a perceptual quantizer (PQ) curve or an IpCpCt curve. The down scaler of the low resolution video processing pipeline generates this second video data by least down scaling the first decoded video data from the first resolution to the second resolution. The down scaling can involve any of or a combination of sampling, lossy compression, and/or ML scaling algorithm.

In an example, the flow includes operation 822, where the multimedia device stores the second video data (e.g., the low resolution, HDR video data) in a second memory buffer of the multimedia device. For instance, the down scaler writes the compressed video data in the second memory buffer. The second memory buffer can be a buffer within the DRAM, isolated from the first memory buffer, a part of the low resolution video processing pipeline, and accessible to one or more processors of this pipeline.

In an example, the flow includes operation 824, where the multimedia device transforms the second video data to the SDR domain. For instance, the HDR-to-SDR processor of the low resolution video processing pipeline receives the second video data from the second memory buffer and uses an HDR-to-SDR mapping to map the encoded luminance values to the SDR domain, where in the SDR domain, the luminance is encoded with a linear curve, such as a gamma curve, to provide the color gamut. The HDR-to-SDR mapping can define a transformation between the no-linear curve of the HDR domain and the linear curve of the SDR domain. As result, the second video data has a low resolution (e.g., the low resolution of 720p or less) and an SDR format (e.g., luminance of about 1,000 nits or less) and can be referred to as third video data having the second resolution and the SDR format.

In an example, the flow includes operation 826, where the multimedia device stores the third video data having the second resolution and the SDR format in a third memory buffer of the multimedia device. For instance, the HDR-to-SDR processor writes the low resolution, SDR video data in the third memory buffer. The third memory buffer can be a buffer within the DRAM, isolated from the first memory buffer, a part of the low resolution video processing pipeline, and accessible to one or more processors of this pipeline.

In an example, the flow includes operation 828, where the multimedia device determines a property of the input video data (or equivalently, the first decoded video data or the video being presented on the display) based on the second video data that has the second resolution and the SDR format (e.g., from the third video data having the second resolution and the SDR format). For instance, a property processor of the low resolution video processing pipeline receives (e.g., reads) the third video data having the second resolution and the SDR format from the third memory buffer and performs an analysis on the received data. As explained herein above, the analysis and the determined property depend on the video-based computing service. Each of the property processor and the HDR-to-SDR processor can be implemented on a CPU and/or a GPU of the multimedia device, where the CPU and the GPU may not have access to the high resolution video processing pipeline (including to the first memory buffer). In an example, operation 828 can be repeated multiple times or multiple instances thereof can be performed sequentially or in parallel (as illustrated in FIG. 8 with the dotted rectangles around operation 828). Doing so supports determining different properties of the input video data, where the multiple properties can be used by the same video-based computing service or by different video-based computing services.

In an example, the flow includes operation 830, where the multimedia device sends the indication of the property. As described herein above, the indication can be sent as output data to at least one of the display, the user interface of the multimedia device, a GPU of the multimedia device, or another device. The output data causes the recipient(s) to present the output data as a visual indication (e.g., on the display, on a GUI of the multimedia device, with light emission from a light source, etc.) or an audible indication (e.g., on a speaker of the display, on a voice interface, such as a speaker, of the multimedia device, on a smart speaker communicatively coupled with the multimedia device, etc.). For instance, and referring to the dominant light video-based computing service, the analysis includes determining that a second set of pixels of the low resolution, SDR video data corresponds to a first set of pixels of the decompressed video data (where the first set is located within an edge of a presentation area on the display), and determining a color of the second set from bit values of the first set. The multimedia device then causes emission by a light source of a light having the color as the visual indication. In an example, operation 830 can be repeated multiple times or multiple instances thereof can be performed sequentially or in parallel (as illustrated in FIG. 8 with the dotted rectangles around operation 830). Doing so supports sending different property indications, where the multiple property indications can be used by the same video-based computing service or by different video-based computing services.

In an example, operation 808, including any or all of operations 820-830, can be repeated multiple times or multiple instances thereof can be performed sequentially or in parallel (as illustrated in FIG. 8 with the dotted rectangles around operation 808). Doing so supports generating multiple low resolution video data, possibly at different low resolutions, where the multiple low resolution video data can be used by the same video-based computing service or by different video-based computing services.

As explained herein above, the low resolution, SDR video data can be used to determine different properties of the input video data for a same video-based computing service or for different video-based computing services. In addition, the low resolution video processing pipeline can generate, from the same input video data, different low resolution video data, each usable to determine one or more properties in support of one or more video-based computing services. Accordingly, certain operations of the flow of FIG. 8, including operations 820-830 can be sequentially repeated or performed multiple times in parallel, to support these various uses of low resolution video data.

For instance, a first video-based computing service is for color dominance. Here, the property is determined by determining a color within a portion of the input video data based on bit values of a set of pixels of the second video data. A second video-based computing service is for object determination (e.g., object detection and/or object recognition). Accordingly, the low resolution video processing pipeline is further used to generate additional video data from the input video data by at least down scaling the input video data to a third resolution, the third resolution being lower than the first resolution and different from the second resolution. In this example, the low resolution video processing pipeline (e.g., the property processor) additionally determines an object (e.g., detecting the object, determining its pixel location, and/or determining an identifier of the object) based on the third video data.

In another illustration, for a same video-based computing service that relies on the property determined at operation 828 or for different video-based computing services, the low resolution video processing pipeline generates additional video data from the input video data by at least down scaling the input video data to a third resolution, the third resolution being lower than the first resolution. Thereafter, the property processor determines, while the first video data is presented, a different property of the input video data on the third video data, where this property is used by the same video-based computing service or by one or more other services of the different video-based computing services.

In yet another illustration, a first video-based computing service is for color dominance. Here, the property is determined based on a first pixel analysis of at least a first portion of the second video data. In this example, the property processor determines, while the first video data is presented, a different property of the input video data based at least in part on a pixel analysis of at least a second portion of the second video data. The different property can be used by the first video-based computing service and/or a second video-based computing service.

Figure 9:
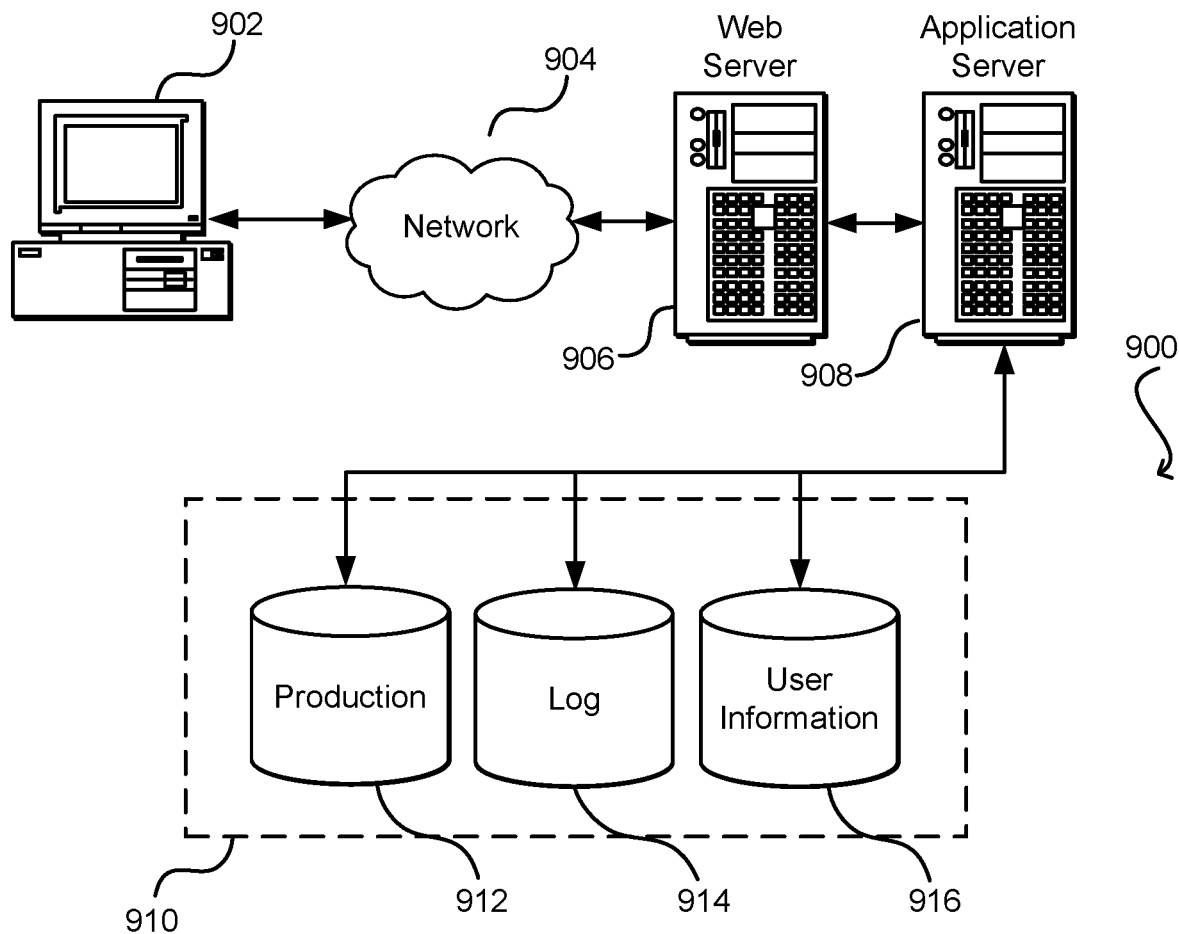
FIG. 9 illustrates an environment in which various embodiments can be implemented.

FIG. 9 illustrates aspects of an example environment 900 for implementing aspects in accordance with various embodiments. As will be appreciated, although a Web-based environment is used for purposes of explanation, different environments may be used, as appropriate, to implement various embodiments. The environment includes an electronic client device 902 (such as any of the multimedia devices described herein above), which can include any appropriate device operable to send and receive requests, messages, or information over an appropriate network 904 and convey information back to a user of the device. Examples of such client devices include personal computers, cell phones, handheld messaging devices, laptop computers, set-top boxes, personal data assistants, electronic book readers, and the like. The network can include any appropriate network, including an intranet, the Internet, a cellular network, a local area network, or any other such network or combination thereof. Components used for such a system can depend at least in part upon the type of network and/or environment selected. Protocols and components for communicating via such a network are well known and will not be discussed herein in detail. Communication over the network can be enabled by wired or wireless connections and combinations thereof. In this example, the network includes the Internet, as the environment includes a Web server 906 for receiving requests and serving content in response thereto, although for other networks an alternative device serving a similar purpose could be used as would be apparent to one of ordinary skill in the art.

The illustrative environment includes at least one application server 908 and a data store 910. It should be understood that there can be several application servers, layers, or other elements, processes, or components, which may be chained or otherwise configured, which can interact to perform tasks such as obtaining data from an appropriate data store. As used herein the term "data store" refers to any device or combination of devices capable of storing, accessing, and retrieving data, which may include any combination and number of data servers, databases, data storage devices, and data storage media, in any standard, distributed, or clustered environment. The application server can include any appropriate hardware and software for integrating with the data store as needed to execute aspects of one or more applications for the client device, handling a majority of the data access and business logic for an application. The application server provides access control services in cooperation with the data store and is able to generate content such as text, graphics, audio, and/or video to be transferred to the user, which may be served to the user by the Web server in the form of HyperText Markup Language ("HTML"), Extensible Markup Language ("XML"), or another appropriate structured language in this example. The handling of all requests and responses, as well as the delivery of content between the client device 902 and the application server 908, can be handled by the Web server. It should be understood that the Web and application servers are not required and are merely example components, as structured code discussed herein can be executed on any appropriate device or host machine as discussed elsewhere herein.

The data store 910 can include several separate data tables, databases or other data storage mechanisms and media for storing data relating to a particular aspect. For example, the data store illustrated includes mechanisms for storing production data 912 and user information 916, which can be used to serve content for the production side. The data store also is shown to include a mechanism for storing log data 914, which can be used for reporting, analysis, or other such purposes. It should be understood that there can be many other aspects that may need to be stored in the data store, such as for page image information and to access right information, which can be stored in any of the above listed mechanisms as appropriate or in additional mechanisms in the data store 910. The data store 910 is operable, through logic associated therewith, to receive instructions from the application server 908 and obtain, update or otherwise process data in response thereto. In one example, a user might submit a search request for a certain type of item. In this case, the data store might access the user information to verify the identity of the user and can access the catalog detail information to obtain information about items of that type. The information then can be returned to the user, such as in a results listing on a Web page that the user is able to view via a browser on the user device 902. Information for a particular item of interest can be viewed in a dedicated page or window of the browser.

Each server typically will include an operating system that provides executable program instructions for the general administration and operation of that server and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 9. Thus, the depiction of the system 900 in FIG. 9 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and other devices capable of communicating via a network.

Most embodiments utilize at least one network that would be familiar to those skilled in the art for supporting communications using any of a variety of commercially-available protocols, such as Transmission Control Protocol/Internet Protocol ("TCP/IP"), Open System Interconnection ("OSI"), File Transfer Protocol ("FTP"), Universal Plug and Play ("UpnP"), Network File System ("NFS"), Common Internet File System ("CIFS"), and AppleTalk. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including Hypertext Transfer Protocol ("HTTP") servers, FTP servers, Common Gateway Interface ("CGP") servers, data servers, Java servers, and business application servers. The server(s) also may be capable of executing programs or scripts in response to requests from user devices, such as by executing one or more Web applications that may be implemented as one or more scripts or programs written in any programming language, such as Java®, C, C#, or C++, or any scripting language, such as Perl, Python, or TCL, as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit ("CPU"), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired)), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, Electrically Erasable Programmable Read-Only Memory ("EEPROM"), flash memory or other memory technology, Compact Disc Read-Only Memory ("CD-ROM"), digital versatile disk (DVD), or other optical storage, magnetic cassettes, magnetic tape, magnetic disk storage, or other magnetic storage devices, or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions, and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known to the inventors for carrying out the disclosure. Variations of those preferred embodiments may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A system comprising:
a display; and
a device coupled with the display and configured to:
receive input video data having a first resolution of at least 3840×2160;
decode the input video data into first decoded video data having the first resolution;
process the first decoded video data through a secure path by at least:
generating compressed video data by at least compressing the first decoded video data according to a lossless compression algorithm;
storing the compressed video data in a first memory buffer of the device;
generating decompressed video data having the first resolution by at least receiving the compressed video data from the first memory buffer and decompressing the compressed video; and
sending the decompressed video data to the display;
process the first decoded video data through a general purpose processor (GPP) path by at least:
generating second video data by at least down scaling the first decoded video data from the first resolution to a second resolution, the second resolution being lower than or equal to 1280×720;
storing the second video data in a second memory buffer of the device; and
determining, by a GPP of the device, a property of the input video data based at least in part on the second video data; and
cause a presentation of at least one of a visual indication or an audible indication of the property.

2. The system of claim 1, wherein the second video data has a high dynamic range (HDR) format, and wherein the device is further configured to:
receive the second video data from the second memory buffer;
generate third video data from the second video data, the third video data having the second resolution and a standard dynamic range (SDR) format, the third video data generated based at least in part on an HDR-to-SDR mapping; and
store the third video data in a third memory buffer of the device, wherein the property of the input video data is determined from the third video data.

3. The system of claim 1, wherein determining the property of the input video data comprises:
determining that a second set of pixels of the second video data corresponds to a first set of pixels of the decompressed video data, wherein the first set is located within an edge of a presentation area on the display; and
determining a color of the second set from bit values of the first set, wherein the device is further configured to cause emission by a light source of a light having the color as the visual indication.

4. A method implemented by a device, the method comprising:
receiving input video data having a first resolution;
generating, in a processing path that includes a first processor and excludes a second processor, first video data based at least in part on the input video data, the processing path configured for digital rights management applicable to the first resolution and inapplicable to a second resolution;
sending, by the first processor of the device, the first video data having the first resolution to a display;
generating second video data from the input video data by at least down scaling the input video data to the second resolution, the second resolution being lower than the first resolution;

determining, by the second processor of the device and while the first video data is presented, a property of the input video data based at least in part on the second video data; and generating, by the second processor, an indication of the property, the indication being output while the first video data is presented.

5. The method of claim 4, further comprising:

generating compressed video data by at least compressing the input video data according to a lossless compression algorithm;

generating the first video data by at least decompressing the compressed video;

generating output data based at least in part on a pixel analysis of the second video data, wherein the output data indicates the property;

sending, by the first processor, the first video data to the display; and sending, by the second processor, the output data to at least one of: the display, a user interface of the device, a graphics processing unit (GPU) of the device, or a second device coupled with the device.

6. The method of claim 5, further comprising:

storing the compressed video data in a first memory buffer that is inaccessible to the second processor;

storing the second video data in a second memory that is accessible to the second processor; and receiving, by the second processor, the second video data to generate the output data.

7. The method of claim 4, further comprising:

determining, by the second processor, bit values for a set of pixels in the second video data based at least in part on a high dynamic range (HDR) to a standard dynamic range (SDR) mapping; and generating, by the second processor, output data based at least in part on the bit values, wherein the output data indicates the property.

8. The method of claim 4, wherein the input video data is down scaled by at least reducing the first resolution of at least 1920×1080 to the second resolution of at most 1280×720.

9. The method of claim 8, wherein the input video data is received by at least receiving video frames at a first frame rate, wherein the second video data is generated by at least further sampling the video frames at a second frame rate that is lower than the second frame rate, and wherein the first video data is sent to the display at the first frame rate.

10. The method of claim 4, wherein the property is determined by at least detecting an object present in the input video data, detecting a pixel location of the object, recognizing the object, or detecting a color within a portion of the input video data.

11. The method of claim 4, wherein the property is determined by determining a color within a portion of the input video data based at least in part on bit values of a set of pixels of the second video data, and further comprising:

generating third video data from the input video data by at least down scaling the input video data to a third resolution, the third resolution being lower than the first resolution and different from the second resolution; and determining, by the second processor of the device and while the first video data is presented, an object based at least in part on the third video data.

12. The method of claim 4, further comprising:

generating third video data from the input video data by at least down scaling the input video data to a third resolution, the third resolution being lower than the first resolution; and determining, by the second processor of the device and while the first video data is presented, a different property of the input video data based at least in part on the third video data.

13. The method of claim 4, wherein the property is determined based at least in part on a first pixel analysis of at least a first portion of the second video data, and further comprising:

determining, by the second processor of the device and while the first video data is presented, a different property of the input video data based at least in part on a pixel analysis of at least a second portion of the second video data.

14. A device comprising:

a first processor configured to:
 generate first video data based at least in part on input video data, and
 send the first video data to a display, the input video data and the first video data having a first resolution;

a down scaler configured to generate second video data based at least in part on the input video data, the second video data having a second resolution that is lower than the first resolution; and a second processor configured to:
 determine, while the first video data is presented, a property of the input video data based at least in part on the second video data, and
 generate an indication of the property, the indication being output while the first video data is presented, the second processor excluded from a processing path that includes the first processor, the processing path configured for digital rights management applicable to the first resolution and inapplicable to the second resolution.

15. The device of claim 14, wherein the first processor is further configured to generate compressed video data based at least in part on the input video data, wherein the first video data and the compressed video data are inaccessible to the second processor.

16. The device of claim 15, wherein the first processor is further configured to receive the input video data and generate the first video data based at least in part on a compression and decompression of the video input data, and wherein the down scaler is configured to receive the input video data in real time relative to the input video data being received by the first processor.

17. The device of claim 14, further comprising:

a first memory buffer accessible to the first processor and inaccessible to the second processor; and a second memory buffer accessible to the second processor, wherein the first processor is further configured to generate compressed video data based at least in part on the input video data and store the compressed video data in the first memory buffer, and wherein the down scaler is further configured to store the second video data in the second memory buffer.

18. The device of claim 17, further comprising:

a third memory buffer accessible to the second processor, wherein the second processor is configured to receive the second video data from the second memory buffer, determine bit values for a set of pixels in the second video data based at least in part on a high dynamic range (HDR) to a standard dynamic range (SDR) mapping, and store the bit values in the third memory buffer.

19. The device of claim 17, wherein the down scaler is included in a hardware block of a system on a chip (SoC), and wherein the hardware block is configured determine bit values for a set of pixels in the second video data based at least in part on a high dynamic range (HDR) to a standard dynamic range (SDR) mapping.

20. The device of claim 14, further comprising a graphics processing unit (GPU) configured to receive the indication, generate graphical user interface (GUI) element data based at least in part on the indication, and output the GUI element data to the first processor, and wherein the first processor is further configured to overlay a GUI element over a presentation of the first video data based at least in part on the GUI element data.

* * * * *